Oct. 10, 1950     A. P. FERGUESON     2,525,595
SCUFF PAD FOR AUTOMOTIVE VEHICLES
Filed May 5, 1948
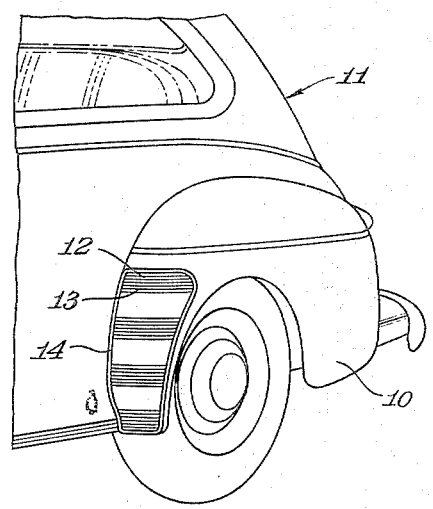
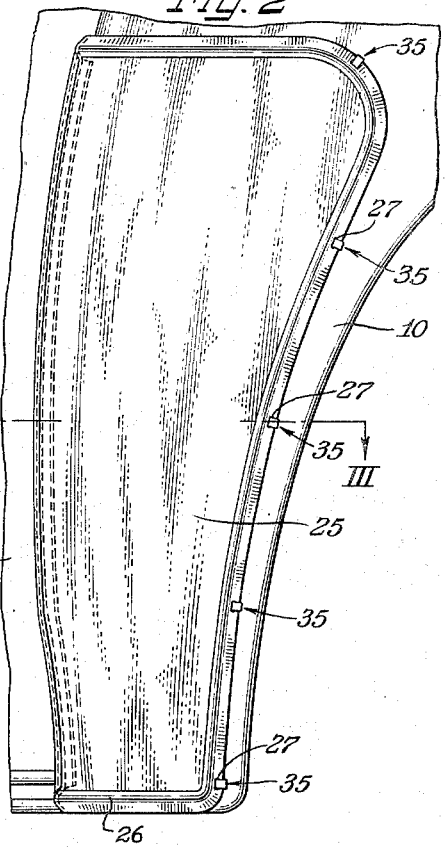
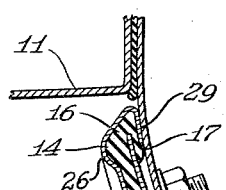
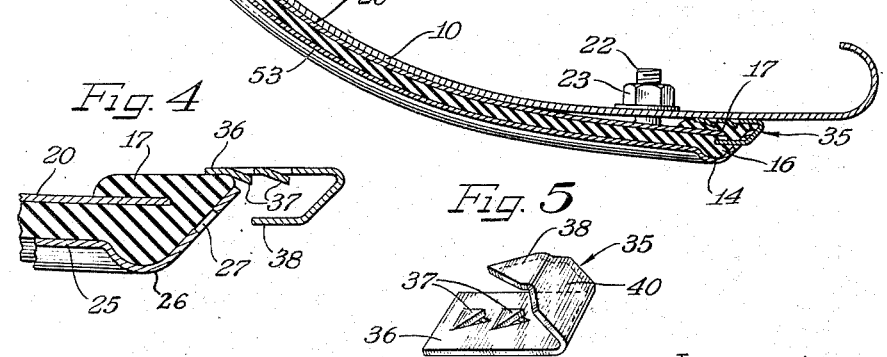
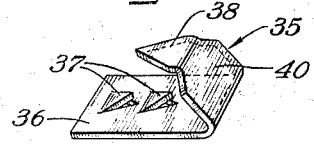
Inventor
Arthur P. Fergueson
by The Firm of Charles W. Hills Attys Patented Oct. 10, 1950

2,525,595

UNITED STATES PATENT OFFICE 2,525,595

SCUFF PAD FOR AUTOMOTIVE VEHICLES

Arthur P. Fergueson, Detroit, Mich., assignor to Houdaille Hershey Corporation, Detroit, Mich., a corporation of Michigan Application May 5, 1948, Serial No. 25,143

6 Claims. (Cl. 280—153)

This invention relates to improvements in scuff pads for automotive vehicles. More particularly it has to do with a shield or cover which is arranged to be positioned over the scuff pad of a fender and to novel means for securing the shield in place on the scuff pad.

Scuff pads are frequently employed on the leading faces of the rear fenders of automobiles to prevent marring of the fenders due to flying stones and other foreign objects when the car is in motion and for preventing marring of the finish of the fender by accidentally kicking the fender while entering the automobile.

Heretofore, scuff pads made of a resilient material such as black rubber have been furnished on automobiles. These black rubber scuff pads are dull and do not present an attractive, ornamental appearance. Furthermore, in time they get to look weather-beaten and worn.

It is therefore an important object of this invention to provide a cover or shield for a rubber scuff pad which may be disposed over the scuff pad of a fender and which will present an attractive, ornamental appearance.

Another object of this invention is to provide novel means for fastening a metallic or other shield or facing panel to a conventional rubber scuff pad.

A still further object of this invention is to provide a composite scuff pad made of an inner resilient member and an outer ornamental shield or facing panel member.

According to the principal features of this invention there is provided a shield or cover member, made of stainless steel or some other highly polished metal or other ornamental material which is arranged to be hooked in place over a standard rubber scuff pad with its marginal edges locked by means of novel clip means to one marginal edge of the rubber scuff pad.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary perspective view of the left rear portion of an automobile showing a standard rubber scuff pad secured to the fender of the vehicle;

Figure 2 is a fragmentary side elevational view of the vehicle of Figure 1 showing the rubber scuff pad covered by an ornamental shield or covering panel according to the teachings of the present invention;

Figure 3 is a fragmentary horizontal sectional view taken substantially on line III—III of Figure 2;

Figure 4 is an enlarged fragmentary horizontal sectional view similar to one end of Figure 3 but showing the clip means just about to be pushed into locking engagement with the rubber scuff pad and the ornamental cover for the scuff pad; and Figure 5 is a perspective view of a locking clip made according to the teachings of the present invention.

As shown on the drawings:

In Figure 1 the reference numeral 10 indicates generally a fender of an automotive vehicle 11. At the forward leading face of this fender, a scuff pad 12 is secured as by any suitable means. This scuff pad 12 may have cross ribbed portions 13 and a raised marginal bead or rib 14 which extends around the scuff pad. There are, of course, many types of scuff pads in current use, some of which do not have either the cross ribbing 13 or the raised marginal edge 14, or both.

While the shield or cover member of this invention may be used in a slightly modified form with any of the current scuff pads, for illustration purposes it is disclosed in this application as particularly adapted to a scuff pad having a marginal beaded portion 14.

Referring to Figure 3 it is seen that the scuff pad 12 has a curved body portion 15, curved to conform to the outline of the fender on which it is mounted. At either marginal edge the pad 12 is provided with an enlarged portion 16 comprising the raised beaded marginal edge 14 and a flat flange portion 17 which is offset inwardly toward the fender from the main body portion 15 of the scuff pad for contacting the fender and holding the body portion 15 spaced therefrom.

On the side of the scuff pad which is next to the fender there is provided a metal reinforcing plate 20 on which the rubber scuff pad may be molded. The ends of the plate 20 are embedded in the enlarged marginal portion 16 of the scuff pad.

For securing this scuff pad to the fender there are provided threaded studs 22 which project inwardly from the metal plate 20 through suitable openings in the fender and are held therein by means of nuts 23.

A novel, ornamental shield or covering panel 25 according to this invention is shown in Figures 2, 3 and 4 and comprises a plate, made of stainless steel or any other highly polished metal or other suitable material, which is shaped to conform generally to the face configuration of the scuff pad 12. An outwardly indented portion 26 is provided around the marginal edges of the plate 25, being shaped to fit snugly over the beaded edges 14 of the scuff pad 12. Along the marginal edge of the plate 25 to be disposed at the outer side of the assembly there are provided apertures 27 for receiving securing clips 35, which will be described presently.

As best seen in Figure 3, the marginal edge of the plate 25 to be disposed closest to the body portion of the automobile has a spaced inturned flange 29 which is arranged to receive the marginal edge of the scuff pad in the complementary channel thus provided. When the plate 25 is to be applied over the scuff pad 12, the inturned flange 29 is first hooked under the scuff pad. The plate 25 is then pressed onto the scuff pad 12 with the other marginal edges of the plate overlying and in snug engagement with the beaded margins 14 of the scuff pad. The assembly is then ready to be clipped together.

As seen in Figure 5, the novel clip 35 of this invention has a generally U-shaped configuration with a long flange 36 carrying inturned diagonal barbs 37 and a relatively short flange 38 connected to the flange 36 by a strap or yoke 40 which is slanted to conform with the slanted margin of the plate 25. The short flange 38 has a pointed end portion for facilitating positioning of the flange between the pad and the fender.

When it is desired to position the clip in retaining engagement with the pad assembly, the flange 36 (Figure 4), is inserted behind the margin of the pad between the pad and the fender wall and with the flange 38 in alignment with one of the holes 27 in the plate 25. When the clip is pushed inwardly the barbs 37 will assume a self-retaining gripping position digging into the flat flange portion 17 of the rubber scuff pad and prevent outward disassembly movement of the clip relative to the scuff pad. The flange 38 at the same time is pressed into the pad through the selected aperture 27 and locks the plate 25 against separation from the scuff pad 12.

While there are shown in Figure 2, five apertures 27 for receiving the clip 35, it is to be understood that as many clips as necessary may be used for holding the shield or covering on the scuff pad.

In this disclosure the shield or plate 25 has been shown as especially adapted to be fitted over a scuff pad having a beaded marginal edge. It will be understood, of course, that the shield 25 may be furnished to fit snugly over a scuff pad which has no beaded edges in which case the shield itself would have no outwardly indented marginal edge. Also, a plate 25 may be furnished for a scuff pad which has no cross ribs 13.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination, a scuff pad secured to a fender, a cover disposed over said scuff pad and having apertures along one edge, a clip for holding said cover on said pad, said clip having a first flange with barbs disposed thereon for gripping said scuff pad and a second flange retainingly disposed through one of the apertures in said covering.

2. In combination, a scuff pad for a fender, said pad having beaded side margins, a covering for said scuff pad having complementary indented margins fitting snugly over the beaded margins of said pad, an underturned flange along one edge of said pad affording a channel retainingly encompassing one margin of the pad and a series of apertures along another edge, and retaining clip means disposed through the apertures in said covering and engageable with said pad for assisting said flange in holding said covering in place.

3. In combination, a scuff pad for a fender, said pad having beaded edges, a rigid backing plate in said pad, studs projecting from said plate for securing said pad to said fender, a covering for said scuff pad comprising a plate member snugly fitting over said scuff pad, and clip means for holding said plate member on said pad.

4. In combination, a rubber scuff pad, a rigid backing plate on said pad with the edges molded into the periphery of the scuff pad, a covering for said scuff pad fitting snugly over the pad, an underturned flange along one edge and a series of apertures along another edge of the covering, said flange engaging about one edge of the scuff pad and retaining clip means disposed through the apertures in said covering and engageable with the rubber at the back of the contiguous margin of the backing plate for assisting said flange in holding said covering in place.

5. In combination, a resilient scuff pad adapted to be secured on a fender, a covering for said scuff pad having substantially the same configuration as said scuff pad and having an inturned flange along one edge and a series of apertures along an opposite edge, said inturned flange being positioned between the marginal portion of said scuff pad and the fender, and clip means comprising an arm member movable into one of said apertures for gripping said scuff pad and a spaced, relatively longer barb-carrying arm member disposed under the associated marginal edge of the scuff pad and barbs on said arm member in gripping contact with the scuff pad.

6. In combination, a resilient pad, a cover panel for said pad having an aperture adjacent one edge, and a retaining clip having an arm extending through said aperture and also having a portion extending about the margin of the cover panel intervening between the aperture and said one edge and about the contiguous edge of the pad and to the back of the pad, said portion having a retaining projection digging into the back of the pad and resisting disassembly of the clip.

ARTHUR P. FERGUESON.

REFERENCES CITED

The following references are of record in the file of this patent:

UNITED STATES PATENTS

| Number | Name | Date |
|---|---|---|
| 2,202,903 | Fergueson | June 4, 1940 |
| 2,216,271 | Joiner | Oct. 1, 1940 |
| 2,270,266 | Cavanagh | Jan. 20, 1942 |
| 2,272,377 | Logan | Feb. 10, 1942 |
| 2,319,936 | Lyon | May 25, 1943 |
| 2,358,206 | Boersma | Sept. 12, 1944 |
| 2,418,076 | Kridler | Mar. 25, 1947 |